United States Patent [19]
Boharski

[11] Patent Number: 4,641,456
[45] Date of Patent: Feb. 10, 1987

[54] MOUSE TRAP

[76] Inventor: Robert Boharski, 7914 W. 92nd St., Hickory Hills, Ill. 60457

[21] Appl. No.: 691,206

[22] Filed: Jan. 14, 1985

[51] Int. Cl.$^4$ .............................................. A01M 1/12
[52] U.S. Cl. ...................................................... 43/73
[58] Field of Search ................... 43/73, 99, 98, 60, 58, 43/65, 77, 76, 75

[56]       References Cited
        U.S. PATENT DOCUMENTS

| | | | |
|---|---|---|---|
| 913,053 | 2/1909 | Riggs | 43/99 |
| 982,001 | 1/1911 | Hardegen | 43/73 |
| 1,281,876 | 10/1918 | Taylor | 43/99 |
| 1,464,697 | 8/1923 | Connolly | 43/75 |
| 2,445,166 | 7/1948 | Crumrine | 43/99 |
| 2,490,017 | 12/1949 | Crumrine | 43/99 |
| 4,145,834 | 3/1979 | Quigley | 43/73 |
| 4,250,655 | 2/1981 | Munns | 43/99 |

Primary Examiner—Gene P. Crosby
Attorney, Agent, or Firm—Paul H. Gallagher

[57] ABSTRACT

A housing has an entrance space into which the mouse enters. A pair of touchplates are embedded in the floor of that space, and when he steps on them, he bridges them and energizes a circuit for operating a pusher plate for pushing the mouse from the entrance space into a pit, where he is confined alive. A space is provided for bait at such location that the mouse is pushed into the pit before he can reach the bait. The pusher plate is actuated by a solenoid in a main circuit activated by a control that itself is energized by the presence of a mouse.

4 Claims, 6 Drawing Figures

MOUSE TRAP

OBJECTS OF THE INVENTION

A broad object of the invention is to provide a novel trap for catching small animals such as mice and rats, and even smaller animal life such as roaches, having the following features and advantages:

1. It will catch the animals repeatedly without re-setting.
2. It will catch and hold the animals alive.
3. It is quick-acting, and holds the trapped animal in such manner that successive animals will not sense the trapping of previous animals, and hence readily enter the trap.
4. It is of extremely simple design and construction, and adapted to pre-design for use selectively in a house, or in industrial or commercial locations, or the exterior such as in alleys and similar places.

DESCRIPTION OF A PREFERRED EMBODIMENT

Figure 1:
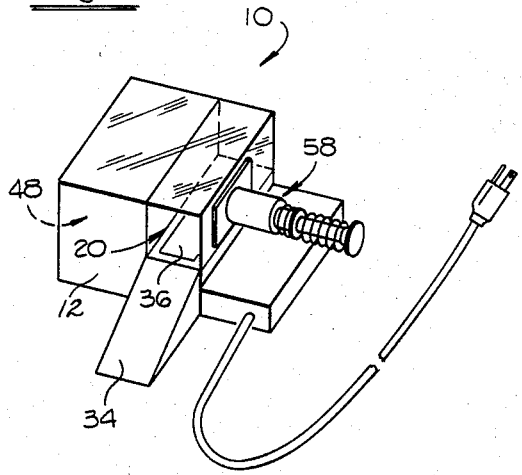
FIG. 1 is a perspective view of a mouse trap embodying the features of the present invention.

Referring to the drawings in general, the various views are semi-diagrammatic in nature, showing the principal components of the device, and their inter-relation, and indicating the functioning thereof. It is preferred, in order to emphasize the principal features, to eliminate as much detail as practical.

Figure 2:
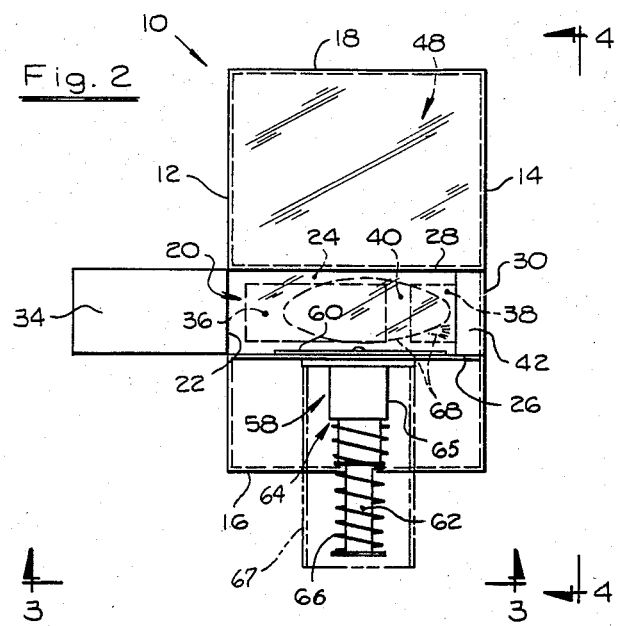
FIG. 2 is a plan view of the device.
Figure 3:
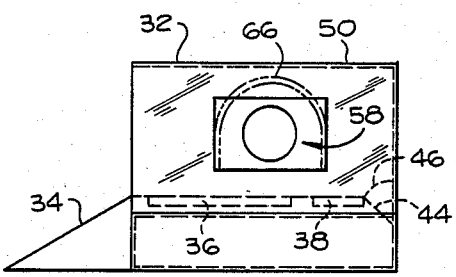
FIG. 3 is a side view, taken at line 3—3 of FIG. 2.
Figure 4:
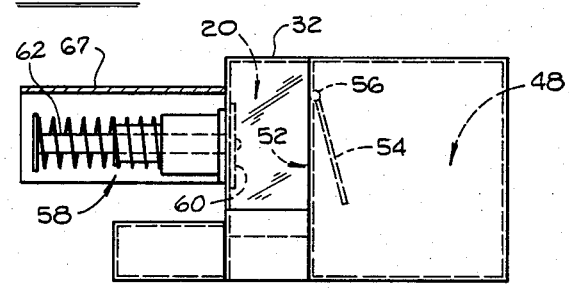
FIG. 4 is a rear view, taken at line 4—4 of FIG. 2.

Referring to the drawings in detail, FIG. 1 is a perspective view of the mouse trap, showing the principal components, and FIGS. 2, 3 and 4 show specific construction thereof. The trap may be made of any suitable material, except that certain elements are made of electrically conductive and insulating materials, respectively, as referred to hereinbelow.

The trap is indicated in its entirety at 10, and includes a housing which for convenience, is referred to as having a front side 12, a rear side 14, a right side 16, and a left hand side 18. The housing defines, adjacent and center thereof, an entrance space 20 having a front open end 22, and a floor 24. It is otherwise bounded by sidewalls 26, 28, a rear wall 30, and a cover or top wall 32 which may be transparent.

The floor 24 is elevated above the supporting surface on which the trap rests, and the trap includes a ramp 34 leading from the supporting surface to the floor. Preferably the ramp is inclined at a certain angle considered to be effective for attracting mice and other animals into the trap, such as, for example, in the neighborhood of 30°.

Embedded in and exposed through the floor 24 are touchplates, including a front one 36 and a rear one 38, spaced apart and insulated from each other by an element of insulation 40, all constituting a part of the floor. The precise positioning, and relative spacing, of these touchplates will be referred to again hereinbelow.

Longitudinally beyond the rear touchplate 38, adjacent the rear of the trap, is a recess or space 42 which may be formed by an inclined element 44 (FIG. 3) of the floor, for placing bait 46.

The housing includes a pit 48 which constitutes a chamber positioned laterally from the entrance space 20, and preferably extends downwardly beyond the floor 24 of the entrance space, into which the trapped mice are pushed from the entrance space. The pit 48 is of course totally enclosed, and may have a transparent cover or top wall 50.

The sidewall 28 of the entrance space is provided with an opening 52 normally closed by a trap door 54 mounted on a hinge 56 and normally biased downwardly to closed position.

Mounted in the housing on the right hand side thereof is a pusher or pusher component 58 which includes a pusher plate 60 disposed in the entrance space opposed to the opening 52. This pusher plate is mounted on a pusher rod 62 forming the armature of a solenoid 64, the solenoid also including a coil 65. The pusher rod or plunger is biased outwardly to inactive position by a compression spring 66, and the solenoid may be covered or partially enclosed by a hood 67 if desired, for appearance's sake.

In the operation of the trap, as the mouse enters the entrance space, he energizes the electrical circuit, of FIG. 5, by stepping on both of the touchplates, as referred to below. The mouse is attracted into the entrance space by the bait 46 and of course crawls into the entrance space, and before he can reach the bait, the foot, or other part of the body of the mouse, as indicated at 68, engages the front touchplate, while he is yet resting on the rear touchplate, and his body completes an electrical circuit across the touchplates.

The positioning of the touchplates, relative to other elements of the housing, is such that when the mouse is in position for bridging the touchplates (FIG. 2) his body is effectively totally within the entrance space, and in register with the horizontal projection of the trap door 54 and the pusher plate 60. The energization of the circuit, by the mouse, as just referred to, energizes the solenoid 64 and advances the pusher rod 62, and the pusher plate 60 hits the mouse and pushes him against the trap door and into the pit 48. The trap door of course thereafter immediately swings closed.

Figure 5:
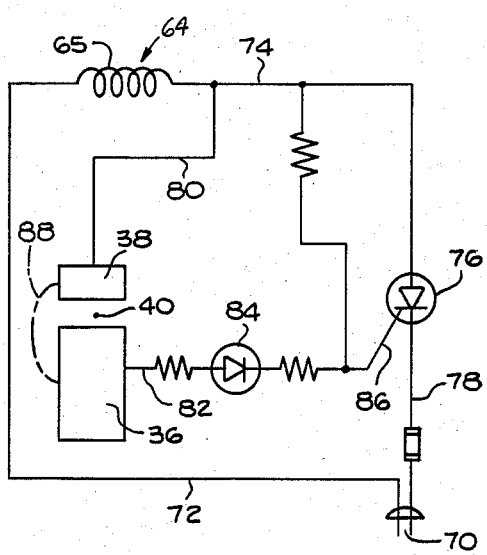
FIG. 5 is a diagram of one form of electrical circuit utilized in the trap.

Referring to the electrical circuit of FIG. 5, a main circuit includes a connector plug or source 70, a first conductor 72 leading to the solenoid coil 65 from which another conductor 74 leads, this conductor leading through an SCR 76 to a conductor 78 and in return to the source 70. This main circuit is normally inactive. As part of an energizing circuit, a conductor 80 leads from the conductor 74 to the touchplate 38, and a conductor 82, having a diode 84, leads from the touchplate 36 to the emitter 86 of the SCR 76.

Upon the mouse engaging both touchplates, as referred to above, it constitutes a conductor therebetween as indicated by the dot-dash line 88 (FIG. 5), and the energizing circuit mentioned is established,—from the source 70, through the conductor 72, solenoid coil 65 (which is not energized up to this point) the conductors 74, 80, the rear touchplate 38, through the body of the mouse (line 88), the front touchplate 36, the conductor 82 to the SCR and the conductor 78, in return to the source 70. This energizing circuit, acting through the plate of the SCR, turns the SCR ON, and closes the main circuit which actuates the solenoid, and the pusher plate.

Figure 6:
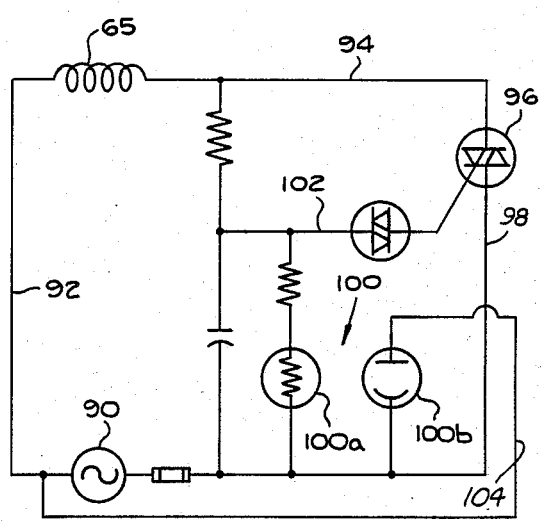
FIG. 6 is a diagram of an alternative electrical circuit.

FIG. 6 shows an alternative electrical circuit that may be used instead of that in FIG. 5. In FIG. 6, a source 90 is shown, from which a conductor 92 leads to the solenoid coil 65 and from the latter, a conductor 94 leads to a triac 96 and from the latter a conductor 98 leads to the source 90. The foregoing circuit is normally inactive. A PE cell 100 includes elements 100a, 100b in conductors 102, 104, respectively, on opposite sides of the triac 96 and the source 90. These elements are positioned on opposite sides of the entrance space 20 (FIG. 2) and when the mouse moves between them, the triac is triggered, energizing the circuit and the solenoid 64. The elements 100a, 100b are positioned at such location that when the mouse moves between them he will be in register with the trap door 54 and the pusher plate 60, in the manner referred to above.

The instrumentalities, diode, SCR, triac and PE cell, may also be referred to as electric valves.

This electrical circuit produces an actuation of the solenoid that is extremely fast, and of only momentary duration, such as in the neighborhood of a single cycle of the solenoid and pusher plate. This fast action pushes the mouse from the entrance space into the pit, and as mentioned above, he has not yet reached the bait. The mouse is not injured because of the size and locations of the pusher plate and the trap door. The mouse is not pushed against any rigid objects, such as the bounding elements defining the opening 52 and the action of the pusher plate is considered entirely negligible, due to the nature of the animal. Experience has shown that mice trapped by this trap will enter into the trap again repeatedly after being released.

I claim:

1. A mouse trap comprising, a housing defining an entrance space having a longitudinal direction and having an opening to the exterior to enable a mouse from the exterior to walk thereinto, the housing having a pit on one side of and immediately adjacent the entrance space, a pusher including a plate positioned with the plate on the other side of and immediately adjacent the entrance space, spaced control elements in the entrance space positioned so as to enable them to be bridged in response to a mouse entering the entrance space, and the control elements being operable in response to being so bridged for actuating the pusher, the housing also including a trap door normally closing the entrance space to the pit, but yielding in response to a mouse being pushed thereagainst and enabling a mouse to be thereby pushed into the pit, and the trap door thereafter re-assuming a closed position trapping the mouse in the pit, and the housing thereby being capable of so trapping the mouse in live condition, circuitry including an electric valve having a control gate in series with the solenoid and operable for normally holding the solenoid inactive, and the circuitry also including said control gate in series with said control elements and with the electrical source and the mouse upon touching the control elements completes circuit through the control elements and gate and the electrical source, and thereby completes circuit through the electric valve and energizes the solenoid.

2. A mouse trap comprising, a housing defining an entrance space having a longitudinal direction and having an opening to the exterior to enable a mouse from the exterior to walk thereinto, the housing having a pit on one side of and immediately adjacent the entrance space, a pusher including a plate positioned with the plate on the other side of and immediately adjacent the entrance space, spaced control elements in the entrance space positioned so as to enable them to be bridged in response to a mouse entereing the entrance space, and the control elements being operable in response to being so bridged for actuating the pusher, the housing also including a trap door normally closing the entrance space to the pit, but yielding in response to a mouse being pushed thereagainst and enabling a mouse to be thereby pushed into the pit, and the trap door thereafter re-assuming a closed position trapping the mouse in the pit, and the housing thereby being capable of so trapping the mouse in live condtion, the pusher includes electrical means for operation thereof, and the spaced control elements include electrically conductive touchplates in the electrical means and fixed in position in the entrance space, and positioned in spaced apart relation and operable in response to touching thereof by the mouse for completing circuit through the mouse and through the electrical means for operating the electrical means and thereby the pusher.

3. A mouse trap according to claim 2 wherein, the housing defines a cavity beyond the touchplates in said entrance direction, constituting a position for bait beyond the reach of a mouse that is in position completing circuit between the touchplates.

4. A mouse trap according to claim 3 wherein, said entrance space is defined by a floor element elevated relative to the bottom of the housing and thereby above the supporting surface on which the trap rests, and the housing includes a ramp leading from the supporting surface to said floor element.

* * * * *